United States Patent [19]

Bender et al.

[11] Patent Number: 5,754,533

[45] Date of Patent: May 19, 1998

[54] METHOD AND SYSTEM FOR NON-ORTHOGONAL NOISE ENERGY BASED GAIN CONTROL

[75] Inventors: Paul E. Bender, San Diego; Brian S. Edmonston, Del Mar, both of Calif.

[73] Assignee: Qualcomm Incorporated, San Diego, Calif.

[21] Appl. No.: 518,218

[22] Filed: Aug. 23, 1995

[51] Int. Cl.$^6$ .................... H04B 1/69; H04J 13/02
[52] U.S. Cl. .................... 370/252; 370/317; 370/320; 375/200; 455/226.3
[58] Field of Search ................ 370/18, 21, 208, 370/252, 317, 318, 320, 335, 342; 375/200, 205, 208, 209, 210; 455/50.1, 52.3, 63, 67.3, 135, 136, 226.2, 226.3

[56] References Cited

U.S. PATENT DOCUMENTS

| | | | |
|---|---|---|---|
| 4,225,976 | 9/1980 | Osborne et al. | 455/226 |
| 5,448,600 | 9/1995 | Lucas | 455/63 |
| 5,559,790 | 9/1996 | Yano et al. | 370/18 |

FOREIGN PATENT DOCUMENTS

| | | | |
|---|---|---|---|
| 0668662 | 8/1995 | European Pat. Off. | H04B 1/707 |
| 0673125 | 9/1995 | European Pat. Off. | H04B 1/707 |

Primary Examiner—Melvin Marcelo
Attorney, Agent, or Firm—Russell B. Miller; Brian S. Edmonston

[57] ABSTRACT

A method and system for processing multiple instances of data using noise energy based gain control is described. A signal is transmitted from a base station and is received along with associated noise energy by a subscriber unit. The non-orthogonal noise energy associated with a signal transmitted to a subscriber unit is measured, and the gain of that signal is adjusted such that the non-orthogonal noise energy is set to a predetermined level. If multiple instances of the signal are received by the subscriber unit, the signals are isolated and the non-orthogonal noise associated with each signal is measured separately. In the preferred embodiment the non-orthogonal noise measurement is performed by demodulation of a low energy channel within a forward link signal processed in accordance with code division multiple access signal processing techniques. A reference value is then divided by the result of this demodulation to calculate a control signal which is used to adjust the gain of a signal associated with a second, higher energy, channel within the forward link signal. The reference value may generated via the use of stored information, or via measurement of another signal that has previously been adjusted to a more optimal energy level.

20 Claims, 4 Drawing Sheets

METHOD AND SYSTEM FOR NON-ORTHOGONAL NOISE ENERGY BASED GAIN CONTROL

BACKGROUND OF THE INVENTION

I. Field of the Invention

The present invention relates to wireless communications. More particularly, the present invention relates to a novel and improved method and system for signal processing using non-orthogonal noise energy based gain control.

II. Description of the Related Art

FIG. 1 is a diagram illustrating a radio frequency (RF) electromagnetic signal transmission associated with the forward link portion of a wireless telecommunications system. Base transceiver station (BTS) 100 transmits a multiple access spread spectrum forward link signal 102(a) upconverted to a radio frequency (RF) bandwidth that is received by subscriber unit 104(a) and (b). Forward link signal 102(a) carries various types of information necessary to conduct the forward link portion of any telephone or other communications calls with subscriber units 104(a) and (b). This information includes pilot data for detecting the presence of forward link signal 102(a), synchronization data for synchronizing with forward link signal 102(a), paging data for notifying a subscriber unit 104 of an incoming call, and various sets of traffic data which generally consist of digital audio information, but may also be digital data. Upon receiving forward link signal 102(a), subscriber units 104(a) and (b) separate the information they need for their particular communication from any remaining information.

To allow forward link signal 102(a) to carry the various types of information in a manner that allows for separation by subscriber units 104(a) and (b), the data associated with each type of information is direct sequence modulated with a unique channel code from a predefined set of channel codes each of which is orthogonal to the others. Once modulated, the various sets of data are spread using a spreading code, and the spread data is summed together and upconverted for transmission via forward link signal 102(a). Subscriber units 104(a) and (b) despread the forward link signal 102(a) upon receipt, and then separate out the information necessary to conduct an associated communication by demodulating the forward link signal 102(a) with a particular channel code from the set of orthogonal channel codes for each type of information. Demodulating the forward link signal 102(a) with a particular channel code removes all other orthogonal energy from the forward link signal 102(a), thereby isolating the data associated with the desired channel from the data associated with the other channels modulated with the other orthogonal channel codes.

Still referring to FIG. 1, tree 105 and building 106 also receive forward link signal 102(a). In response, tree 105 generates forward link signal 102(b) and building 106 generates forward link signal 102(c) via the process of signal reflection. In the configuration shown, forward link signals 102(b) and (c) are transmitted over a portion of the same area over which forward link signal 102(a) is transmitted. In alternative wireless telecommunication system configurations, BTS 100 transmits multiple forward link signals 102 to portions of the surrounding area, generally referred to as "sectors", via directional antennas. Subscriber unit 104(a) is located such that it receives all three of forward link signals 102(a), (b), and (c), while subscriber unit 104(b) is located such that it receives only forward link signals 102(a) and (b). Each subscriber unit 104 detects each forward link signal 102 received, and extracts the data associated with the information necessary to conduct an associated communication from each forward link signal 102 via demodulation with the appropriate channel codes. Once the data from each forward link signal 102 is obtained, it is processed and combined in various ways that increase the likelihood of accurate reproduction of the associated information when compared to the accuracy of the information resulting from the processing of a single forward link signal 102.

FIG. 2 is a block diagram of the RF signal reception and processing portion of subscriber units 104 (FIG. 1) when configured in accordance with the prior art. RF signal processing system 203 is coupled to antenna system 202 and automatic gain control (AGC) system 200. The output of analog signal processing system 201 is applied to searcher 206 and despreaders 208(a)–(c). The inputs of demodulators 210(a)–(c) are coupled to the outputs of despreaders 208(a)–(c) respectively, and each generates data that is asserted at outputs 212(a)–(c).

During operation, any RF signals received by antenna system 202 having frequencies that fall within a predetermined bandwidth are downconverted by RF signal processing system 203 and supplied to AGC system 200. AGC system 200 measures the energy level of the downconverted signals and amplifies or attenuates them as necessary to place the energy level of those signals within a predetermined decibel range. The predetermined decibel range is precisely selected to take into account the various changes to the down converted signals that are expected to take place during the additional processing within a subscriber unit 104, and to place any signals at the output of despreaders 208(a)–(c) within an optimal decibel range. This adjustment maybe assisted via the use of a feedback loop from a node within the subscriber unit 104 to AGC 200, with one such node being the output of analog signal processing system 201. The gain adjusted signals are then applied to analog signal processing system 201 which further downconverts and digitizes the signals, and applies the digitized signals to searcher 206. Searcher 206 receives the digitized signals and identifies any forward link signals 102 transmitted from BTS 100 by searching for the associated pilot channel.

When a forward link signal 102 is detected, searcher 206 calculates an arrival time for that forward link signal 102, which in the preferred embodiment takes the form of a time offset from a synchronization signal, and assigns one of despreaders 208(a)–(c) to despread the forward link signal 102 using the time offset. Despreading is generally performed via direct sequence demodulation, or integration, using a spreading code. As additional forward link signals 102 are identified, searcher 206 identifies those of the highest quality and assigns despreaders 208(a)–(c) to despread these signals. The resulting despreaded signals from despreaders 208(a)–(c) are passed to demodulators 210(a)–(c) which demodulate the signals using the various channel codes. In particular, the despreaded signals are demodulated using a set of channel codes that include a pilot channel code, a synchronization channel code, and a traffic channel code with the appropriate traffic channel code being unique for each subscriber unit 104 engaged in a telephone call or other communications with BTS 100. The demodulated signals from demodulators 210(a)–(c) can then be received by other signal processing systems within the subscriber unit 100 which will generally combine the signal using various well known techniques in order to generate a single signal used for further processing.

While the above described system identifies and processes a forward link signal 102 in a manner that allows a signal carrying data from associated channels to be provided to other signal processing systems for further processing, the condition in which the signal is provided is not optimal. This is because the multiple instances of the forward link signal 102 processed each travel via a different path to arrive at the subscriber unit 104 at different times, therefore incurring different amounts of signal loss and becoming associated with different amounts of noise energy. Since the gain control adjustment made by AGC system 200 is performed on a combination of those forward link signals 102, however, as well as on all of the noise energy associated with anyone of the forward link signals 102, the different amounts of signal loss and the fact that a portion of the noise energy is orthogonal to the desired signal are not taken into account during this gain adjustment.

Additionally, during the processing of forward link signals 102, the portion of this noise energy that is orthogonal to the forward link signal is removed before the data value being transmitted is determined. Thus, the energy level of the signal is improperly adjusted based on noise energy that will not be present during the actual processing of the signal. This improper adjustment can result in the signals at output nodes 212(a)-(c) being at an unknown and less than optimal decibel levels for any additional signal processing systems both in an absolute sense, and relative to one another. Various problems can result from providing the signals in a less than optimal manner including an increase in the resulting error rate associated with the transmission via forward link signal 102 which degrades the quality of the audio information or digital data ultimately produced by subscriber units 104. Therefore, a need exists for an improved method of signal processing that allows for more accurate adjustment of the energy level of a forward link signal 102 being received.

SUMMARY OF THE INVENTION

Based of the forgoing, a novel and improved method and system for signal processing using non-orthogonal noise energy based gain control is described. A radio frequency signal is transmitted from a base station and is received along with associated noise energy by a subscriber unit. The noise energy that can not be removed by various noise removal procedures and which is associated with the signal is measured, and the gain of that signal is adjusted such that the noise energy is set to a predetermined level. If multiple instances of the signal are received by the subscriber unit, the signals are isolated and the noise associated with each signal is measured separately. In the preferred embodiment, the noise measurement is performed by demodulation of a low energy channel within a signal processed in accordance with code division multiple access signal processing techniques. A reference value is then divided by the result of this demodulation to calculate a control signal which is used to adjust the gain of a signal associated with a second, higher energy, channel within the code division multiple access processed signal. The reference value may be generated via the use of stored information, or via measurement of another signal that has previously been adjusted to a known and more optimal energy level.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENT

A method and system for multiple access signal processing having multipath orthogonal noise detection and compensation capability is described. In the following description, various signal processing systems and the arrangements thereof are described in detail. It will be apparent to one skilled in the art that a variety of well known methods and apparatus for implementing such signal processing systems may be used including the use of digital signal processors and digital microprocessors controlled by software, or custom designed integrated circuits, with the latter being used in the preferred embodiment. Additionally, various signals and arrangements thereof are described in detail, including multiple instances of a forward link signal generated via the process of reflection. It will be apparent to one skilled in the art that other mechanisms for generating these multiple instances of a forward link signal are consistent with the operation of the present invention including base transceiver stations that transmit multiple forward link signals and the use of multiple base transceiver stations. Also, the following description sets forth the use of a synchronization channel for measuring the amount of non-removable noise energy, with that synchronization channel being carried by a forward link signal processed in accordance with code division multiple access techniques. It will be apparent that the use of another low energy channel is consistent with the present invention, as well as the use of other methods for measuring non-removable noise within the context of systems employing other signal processing techniques.

In other instances throughout the application, various well known systems are described in block form. This is done in order to avoid unnecessarily obscuring the disclosure of the present invention. Where multiple instances of a particular system are shown, a single instance of that system may generally be substituted, with the use of that system being time shared between the various functions performed by the multiple systems. In general, the signals and data referred to throughout the application constitute electronic, voltage dependent, representations of various types of digital information including digital audio information generated via the sampling of physical phenomena such as sound waves, or voltages generated for the purpose of controlling other electronic systems. Systems other than land based wireless cellular telecommunication systems will benefit from the use of the present invention, including satellite based wireless telecommunication systems.

Figure 3:
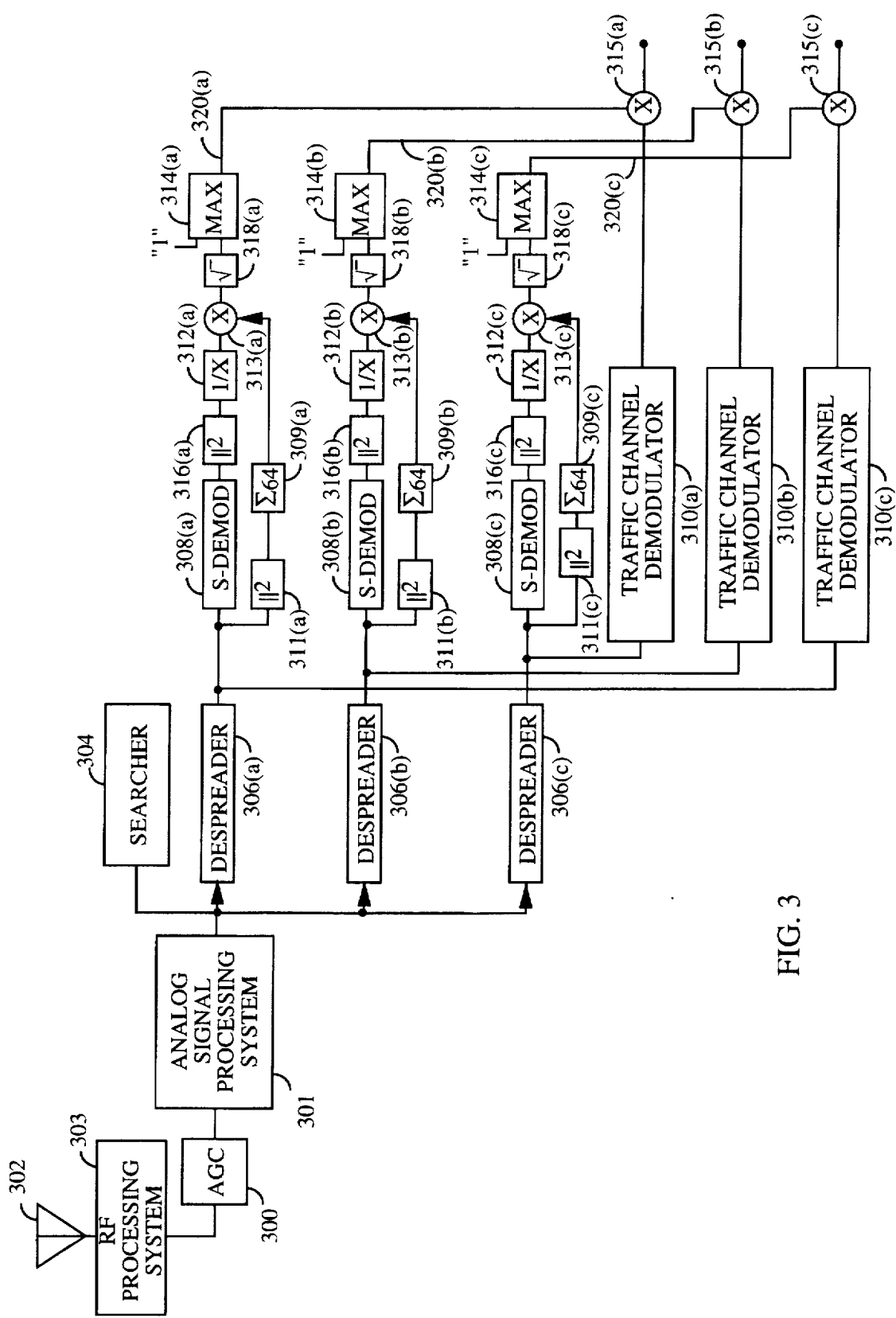
FIG. 3 is a block diagram of the RF signal reception and processing portion of a subscriber unit when configured in accordance with the one embodiment of the invention.

FIG. 3 is a block diagram of the radio frequency (RF) signal reception and processing portion of a subscriber unit 104 (FIG. 1) when configured in accordance with the one embodiment of the invention. RF signal processing system 303 is coupled to antenna system 302 and automatic gain control (AGC) system 300. Analog signal processing system 301 is coupled to AGC 300 as well as to despreaders 306(a)–(c), and searcher 304. The output of despreaders 306(a)–(c) are applied to absolute value squared systems 311(a)–(c), synchronization channel demodulators 308(a)–(c) (labeled "S-DEMOD") and traffic channel demodulators 310(a)–(c). The outputs of synchronization channel demodulators 308(a)–(c) are applied to multiplication circuits 313(a)–(c) through absolute value squared circuits 316(a)–(c) and inversion circuits 312(a)–(c). The outputs of absolute value squared systems 311(a)–(c) are applied to multiplication circuit 313(a)–(c) through summation circuits 309(a)–(c). The outputs of multiplication circuits 313(a)–(c) are applied to square root circuits 318(a)–(c). MAX circuits 314(a)–(c) receive the output of square root circuits 318(a)–(c) and generate control signals 320(a)–(c) which are applied to multiplication circuits 315(a)–(c). The outputs of traffic channel demodulators 310(a)–(c) are applied to the inputs of multiplication circuits 315(a)–(c).

During operation. RF signals received by antenna system 302 having frequencies that fall within a predetermined bandwidth are downconverted by RF signal processing system 303 and applied to AGC system 300. AGC system 300 places the signals in a predetermined decibel range and applies the adjusted signals to analog signal processing system 301. Analog signal processing system 301 downconverts and digitizes the RF signals and applies the digitized information to searcher 304 and despreaders 306(a)–(c). Searcher 304 identifies any forward link signals 102 (FIG. 1) received within the digitized signals using the associated pilot channel carried by the forward link signal 102, and calculates a time offset for each forward link signal 102 identified. Additionally, searcher 304 configures despreader 306(a)–(c) to despread the forward link signals 102 that are identified using the predefined spreading code. The despread signals from despreader 306(a)–(c) are applied to synchronization channel demodulators 308(a)–(c), traffic channel demodulators 310(a)–(c), and absolute value squared systems 311(a)–(c), each in a respective manner. As noted above, feedback loops may exist that are routed to AGC 300 from various nodes within subscriber unit 104 including the output of analog signal processing system 301 to allow precise control of the energy level of those nodes, as well as subsequent nodes.

Synchronization channel demodulators 308(a)–(c) extract the data associated with the synchronization channel by demodulating the despread signal with a particular channel code that is assigned to the synchronization channel. This demodulation is performed by direct sequence integration of the signal with the associated channel code, which has sixty-four chips in the preferred embodiment of the invention. Absolute value squared systems 311(a)–(c) receive the despread signals from despreaders 306(a)–(c) and calculate the energy level of the despread signal. Summation circuits 309(a)–(c) calculate the sum of these energy levels in sixty-four set increments, which correspond to the number of chips within the channel code in the preferred embodiment of the invention. If a channel code having a different number of chips were used, summation circuits 309(a)–(c) would calculate the sum of the energy levels in corresponding increments. Absolute value squared circuits 316(a)–(c) calculate the energy level of the signal from synchronization channel demodulators 308(a)–(c) and apply the results to inversion circuits 312(a)–(c). Multiplication circuits 313(a)–(c) multiply the output of summation circuits 309(a)–(c) by the outputs of inversion circuit 312(a)–(c), which is equivalent to dividing the output of summation circuits 309(a)–(c) by the output of absolute value circuits 316(a)–(c). Square root circuits 318(a)–(c) calculate the square root of the results from multiplication circuits 313(a)–(c). MAX circuits 314(a)–(c) compare the result of this square root operation with a reference value labeled "1" and generate control signals 320(a)–(c) which are applied to multiplication circuits 315(a)–(c).

Traffic channel demodulators 310(a)–(c) also receive the outputs of despreaders 306(a)–(c) and isolate a traffic channel by demodulating the despread signals using a predetermined channel code assigned to that traffic channel. As mentioned above, a traffic channel carries digital audio or digital data associated with a particular telephone call, or both. Multiplication circuits 315(a)–(c) receive the demodulated traffic channel data from traffic channel demodulators 310(a)–(c) and amplify the signals according to control signals 320(a)–(c) from MAX circuits 314(a)–(c). The reference values label "1" applied to MAX circuits 314(a)–(c) are set to a value that causes multiplication circuits 315(a)–(c) to introduce no amplification into the signals from traffic channel demodulators 310(a)–(c). The signal generated at the outputs of multiplication circuits 315(a)–(c) can then be processed by other signal processing circuitry within the subscriber unit 104. In the preferred embodiment, this additional signal processing circuitry generates a single instance of the data associated with the traffic channel using the three instances provided.

Figure 1:
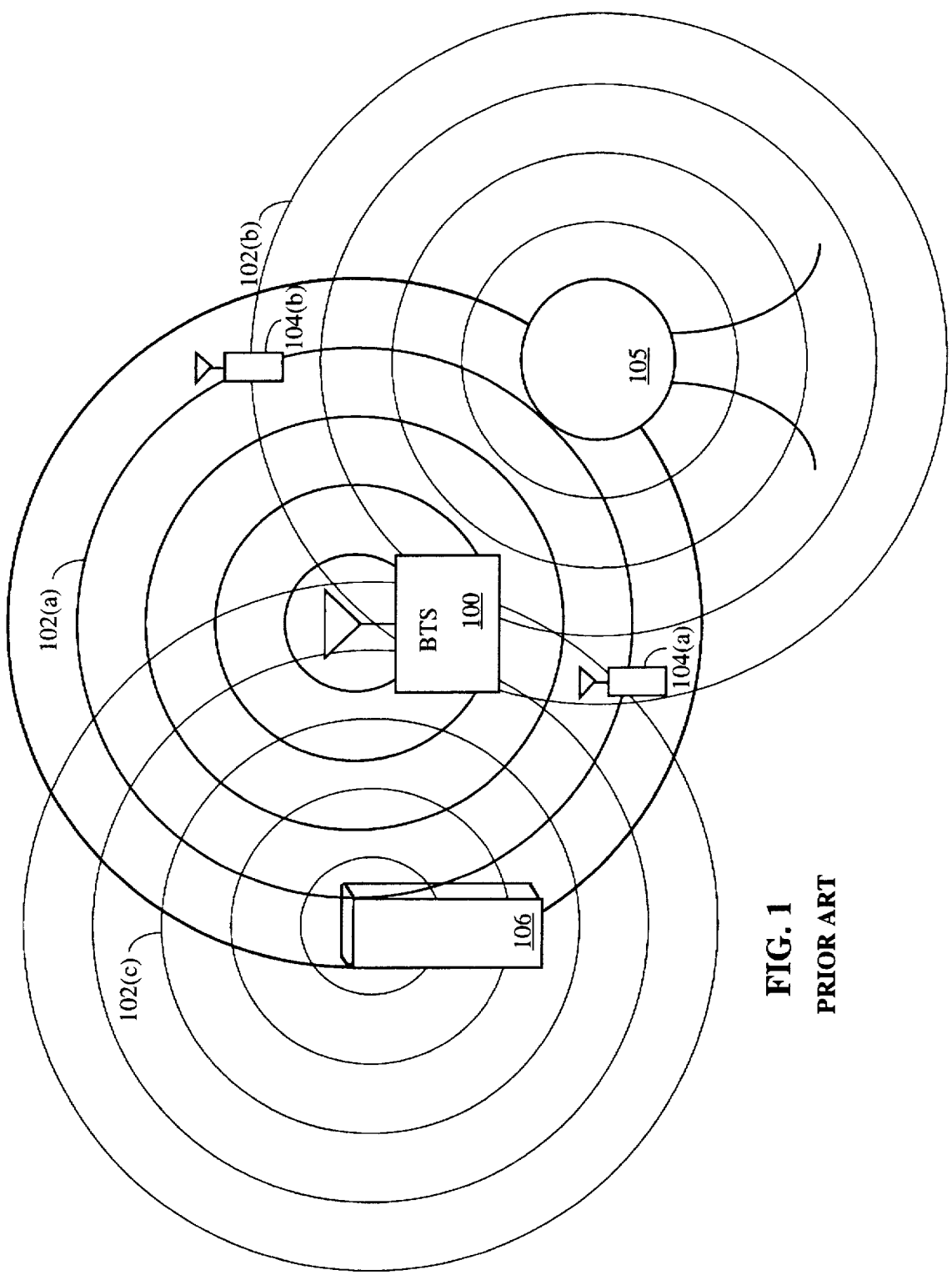
FIG. 1 is a diagram illustrating a radio frequency (RF) transmission associated with the forward link portion of a wireless telecommunications system.
Figure 2:
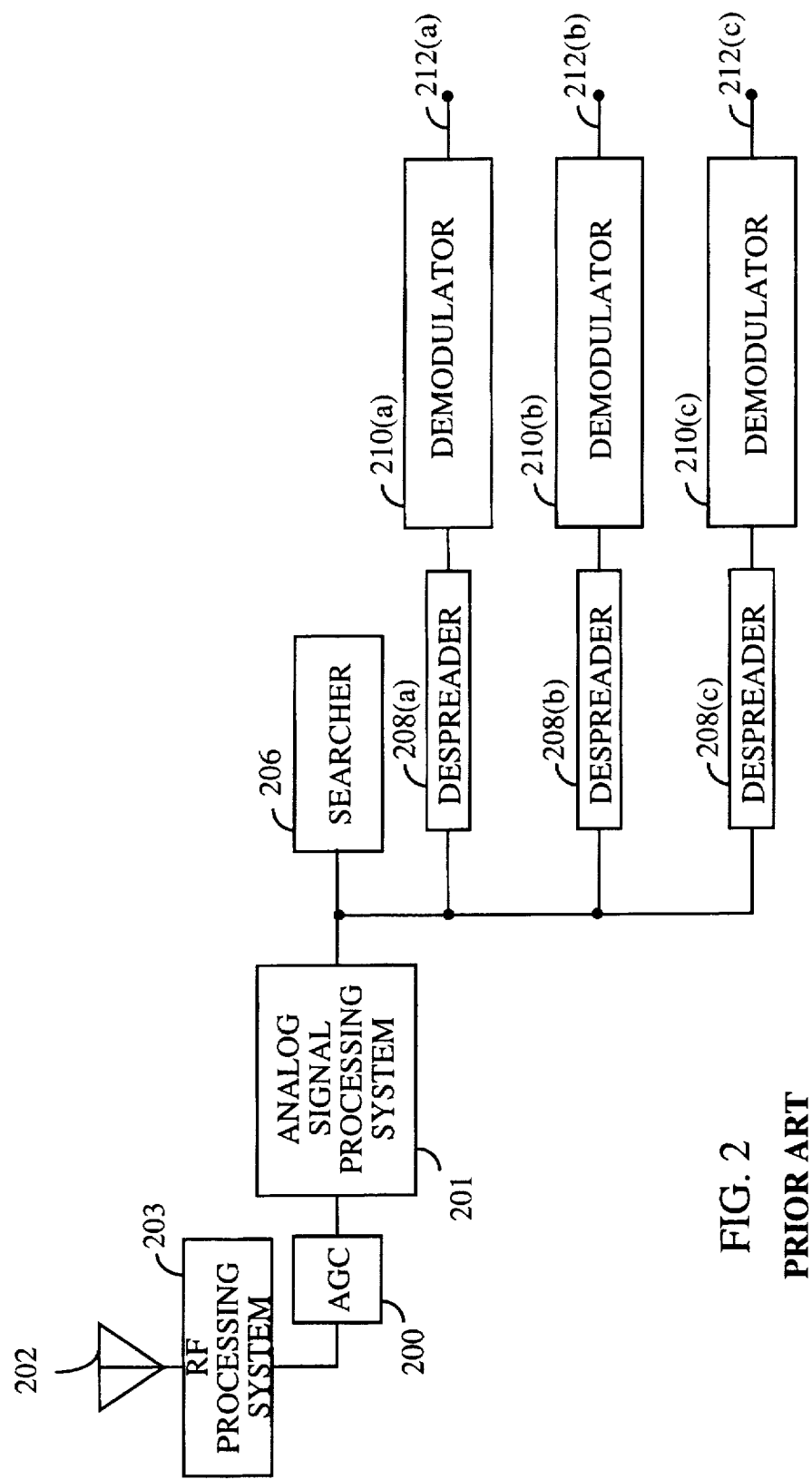
FIG. 2 is a block diagram of the RF signal reception and processing portion of a subscriber unit when configured in accordance with the prior art.

As described above, the synchronization channel carries information for assisting subscriber units 104 in demodulating the corresponding traffic channel and in staying in synchronization with the BTS 100 (FIG. 1). The amount of information necessary to perform this task is relatively small, however, when compared to the amount of information carried by a traffic channel. Because the energy levels of the associated with the traffic channels are kept at a minimum, and the energy level of the synchronization channel is lower still, the energy level of the signal at the output of synchronization channel demodulators 308(a)–(c) is primarily a function of the noise that could not be removed by synchronization channel demodulators 308(a)–(c), rather than of the synchronization signal itself. Therefore, any measure of the energy level of the signal at the output of synchronization channel demodulators 308(a)–(c) provides a reasonable indication of the amount of noise energy associated with the forward link signal 102 being demodulated.

By dividing the energy level of the despread signals from despreaders 306(a)–(c) by the energy level of the signals from synchronization channel demodulators 308(a)–(c), adjustment signals are generated having values equal to the amount the energy level of the signals at the outputs of the synchronization channel demodulators 308(a)–(c) must be adjusted to be equal to the energy level of the signals at the input of synchronization channel demodulators 308(a)–(c). Since the signals at the outputs of the synchronization channel demodulators 308(a)–(c) consist essentially of noise energy, these values are equal to the amount of amplification necessary to place the decibel level of that noise energy equal to the decibel level of the input signals. Square root circuits 318(a)–(c) convert the value of these adjustment signals to the values necessary for adjusting the signal or voltage level of the signals from synchronization channel demodulators 308(a)–(c) in order to achieve the desired adjustment in the energy level.

The signals from square root circuits 318(a)–(c) are in turn used to generate control signals 320(a)–(c) via MAX circuits 314(a)–(c) which pass the signals directly through unless the adjustment signals have a value that is less than the reference value of "1" supplied to the other input of MAX circuits 314(a)–(c). MAX circuits 314(a)–(c) are utilized because the energy level of the signals from synchronization channel demodulators should never be greater than the energy level of the signals from despreaders 306(a)–(c) and such a situation would correspond to a signal from multiplication circuits 313(a)–(c) that is less than the reference value "1". This can therefore be interpreted as an error condition, which is properly overridden by the generation of reference value "1" by MAX circuits 314(a)–(c). As noted above, the reference value "1" is set to a value that will cause multiplication circuits 315(a)–(c) to introduce no amplification to the signals applied to their inputs.

Control signals 320(a)–(c) from MAX circuits 314(a)–(c) cause multiplication circuits 315(a)–(c) to increase the energy level of the signals from traffic channel demodulators 310(a)–(c) applied to their inputs by an amount necessary to set the energy level of the signals at the output of synchronization channel demodulators 308(a)–(c) equal to the energy level of the signals at the outputs of despreaders 306(a)–(c). Since traffic channel demodulators 310(a)–(c) are demodulating the same corresponding forward link signals 102 as synchronization channel demodulators 308(a)–(c), using only a different channel code, the amount of noise energy present in the signals at the outputs of each will be similar. Hence, amplifying the signals from traffic channel demodulators 310(a)–(c) by that amount will set the noise energy component of those signals equal to the energy level of the signals at the outputs of despreaders 306(a)–(c). Since the energy levels of the signals at the outputs of despreaders 306(a)–(c) are set to be at an optimal level by AGC system 300, and are generally equal in value, this will effectively adjust the gain of the signals from the outputs of traffic channel demodulators 310(a)–(c) to the optimal and known level based on the noise energy component of those signals. (More particularly, the noise energy that can not be removed by demodulation.) These signals can then be processed further by other signal processing systems in an improved manner over the prior art.

Figure 4:
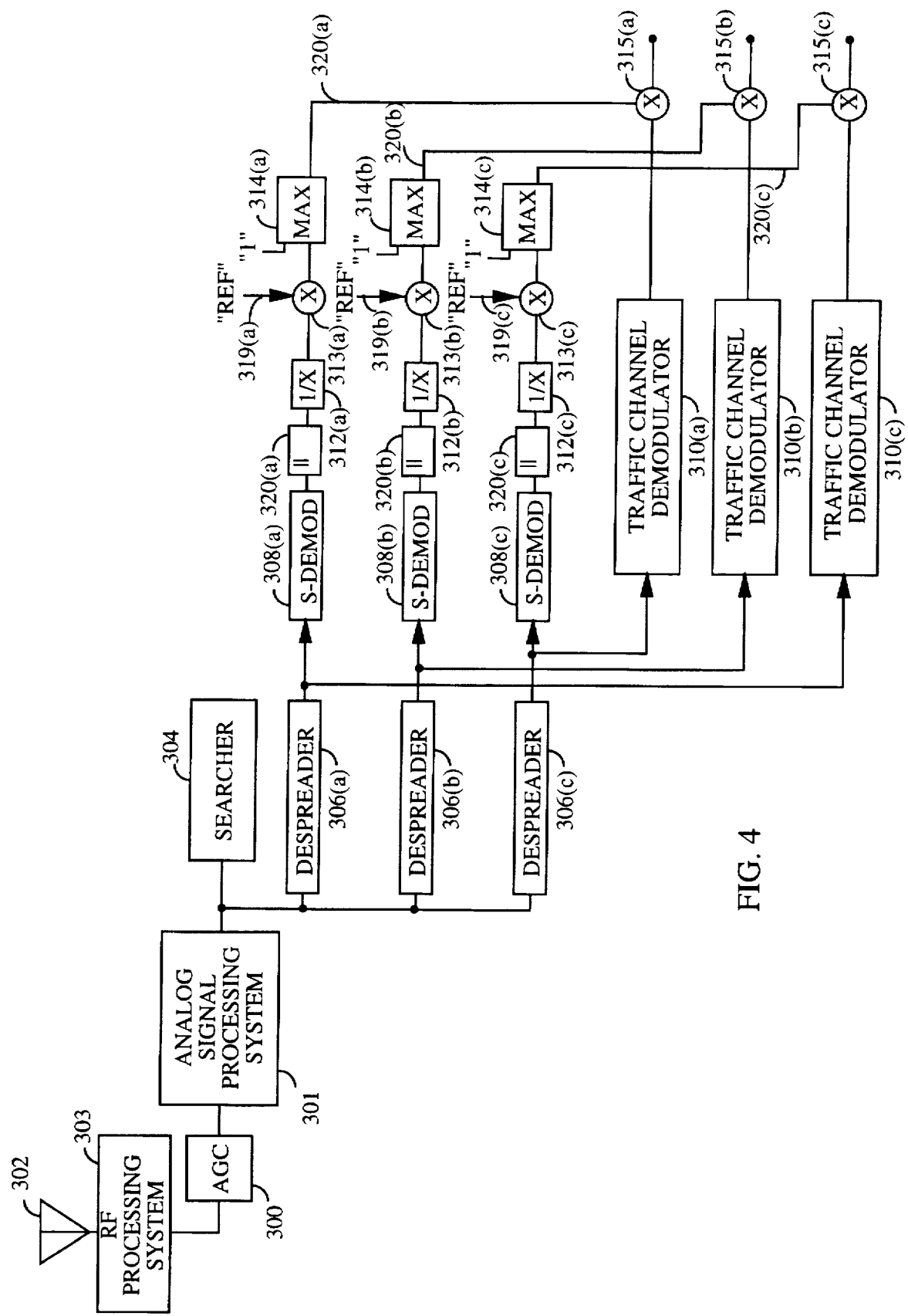
FIG. 4 is a block diagram of the RF signal reception and processing portion of a subscriber unit when configured in accordance with a second embodiment of the invention.

FIG. 4 is a block diagram of a portion of the signal processing circuitry associated with a subscriber unit 104 configured in accordance with a second embodiment of the invention. It is similarly configured with respect to FIG. 3 except for the removal of absolute value squared systems 311(a)–(c) and 316(a)–(c), square root circuits 318, and summation circuits 309(a)–(c), as well as the addition of reference signals 319(a)–(c) and absolute value systems 320(a)–(c). Reference signals 319(a)–(c) are generally set to the optimal average signal level at which the non-removable noise component of the signal from traffic channel demodulators 310(a)–(c) should be set. Reference signals 319(a)–(c) are divided by the absolute value of the signal level of the output of synchronization channel demodulators 308(a)–(c) by inversion circuits 319(a)–(c) and multiplication systems 313(a)–(c). As mentioned above, the energy level of the synchronization channels consists essentially of the noise that cannot be removed by synchronization channel demodulators 308(a)–(c), since a synchronization channel carries a relatively small amount of data.

The outputs of traffic channel demodulators 310(a)–(c) are amplified by the result of this multiplication using multiplication circuits 315(a)–(c) which adjust the signals by an amount that sets the energy level of the noise component of the signals to the associated reference values which in the preferred embodiment are equal to each other. The use of energy levels in this second embodiment is unnecessary because the reference value 319 can be adjusted for signal levels as opposed to energy levels. This second embodiment is more useful where the optimal energy level of the noise component of the signals from traffic channel demodulators 310(a)–(c) is different from the optimal energy level of the signals from the output of despreaders 306(a)–(c), and for systems in which a reference value may more easily be incorporated via the use of software or programmable circuitry than via the incorporation of the additional circuitry of FIG. 3. Additionally, no square root circuits 318 are required because the value of reference signals 316 can be set so that the proper adjustment value is generated directly from the signal levels of the signal from synchronization channel demodulators 308.

By measuring the non-removable noise energy associated with each instance of the forward link signal 102 received, and amplifying the associated traffic channel individually according to that noise energy, improved data transmission and processing is achieved. This is because the decibel level of the signals from multiplication circuits 315(a)–(c) associated with the traffic channels will be more optimally adjusted relative to the adjustment made by AGC 300 on the combination of the forward link signals 102 as was the convention in prior art systems, since the unique amount of signal loss and noise introduction experienced by each associated forward link signal 102 is taken into account. Furthermore, performing this adjustment based on the noise level component of each instance of forward link signal 102 instead of the combination of the noise and signal energy, as was also the prior art convention, causes the relative decibel level of the signals to be normalized such that the noise floor for each will be identical. This facilities further processing of the signals because the relative signal strength will be directly indicative of the quality of the signals, and any additional signal processing circuitry will be able to more properly weigh or consider the signals during the additional signal processing.

Thus, an improved method and apparatus for processing a digital signal is described. The description of the preferred embodiment is provided to enable any person skilled in the art to make or use the present invention. Various modifications of the invention will be readily apparent to one skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I (We) claim:

1. A method for processing a forward link signal comprising the steps of:
    (a) converting a plurality of instances of said forward link signal and a corresponding plurality of noise energies into a plurality of received digitized samples; and
    (b) amplifying each received digitized sample in said plurality by an amount sufficient to set each of said corresponding noise energy to a substantially equal value.

2. The method as set forth in claim 1 wherein said forward link signal has a plurality of channels, and step (b) is comprised of the steps of:
    (b.1) demodulating an instance of said plurality of instances of said forward link signal to isolate a first channel from said plurality of channels;
    (b.2) demodulating said instance of said plurality of instances of said forward link signal to isolate a second channel from said plurality of channels; and (b.3) amplifying said second channel by an amount equal to a reference value divided by said first channel.

3. The method as set forth in claim 2 further comprising the steps of:

adjusting a total energy level of said plurality of instances of said forward link to an optimal energy level; and generating said reference value using said total energy level.

4. The method as set forth in claim 2 wherein said reference value is a stored value.

5. The method as set forth in claim 3 further comprising the step of despreading each instance of said forward link signal from said plurality of instance of said forward link signal before performing said step of generating said reference value.

6. A system for processing data comprising:

forward link processing system for converting a plurality of instances of a forward link signal and a corresponding plurality of noise energies into a plurality of received signals; and amplification system for amplifying each of said plurality of received signals by an amount sufficient to set said corresponding plurality of noise energies to a substantially equal value.

7. The system as set forth in claim 6 wherein said forward link signal has a plurality of channels, and said amplification system is comprised of:

first demodulation system for demodulating said forward link signal to isolate a first channel from said plurality of channels;

second demodulation system for demodulating said forward link signal to isolate a second first channel from said plurality of channels applied to said amplification system; and control signal generation system for generating a control signal that causes said amplification system to amplify said second channel by an amount equal to a reference value divided by said first channel.

8. The system as set forth in claim 7 further comprising:

automatic gain control system for adjusting each instance of said forward link signal from said plurality of instances to an optimal energy level, wherein said control signal generation system generates said reference value using said optimal energy level.

9. The system as set forth in claim 7 wherein said reference value is a stored value.

10. The system as set forth in claim 8 further comprising:

despreader system for despreading each instance of said forward link signal from said plurality of instance of said forward link signal before providing each instance of said forward link signal to said control signal generation system.

11. A subscriber unit for a wireless telephone system comprising:

means for converting a plurality of instances of a forward link into a plurality of received samples signal and a corresponding plurality of noise energies; and means for amplifying each of said plurality of digitized receive samples by an amount sufficient to set said corresponding plurality of noise energies to a substantially equal value.

12. The subscriber unit as set forth in claim 11 further comprising:

means for demodulating said forward link signal to isolate a first channel from a plurality of channels;

means for demodulating said forward link signal to isolate a second first channel from said plurality of channels applied to means for amplifying; and means for generating a control signal that causes said means for amplifying to amplify said second channel by an amount equal to a reference value divided by said first channel.

13. The subscriber unit as set forth in claim 12 further comprising: means for adjusting each instance of said forward link signal from said plurality of instances to an optimal energy level, wherein said means for generating a control signal generates said reference value using said optimal energy level.

14. The subscriber unit as set forth in claim 12 wherein said reference value is a stored value.

15. The subscriber unit as set forth in claim 13 further comprising:

means for despreading each instance of said forward link signal from said plurality of instance of said forward link signal before providing each instance of said forward link signal to said means for generating a control signal.

16. A method for processing a signal that carries a plurality of channels in accordance with code division multiple access signal processing techniques comprising the steps of:

(a) storing said signal;

(b) measuring an energy level of non-orthogonal noise associated with said signal by demodulating said signal; and (c) amplifying said stored signal by an amount sufficient to set said energy level to a predetermined value.

17. The method as set forth in claim 16 wherein step (b) is comprised of the step of demodulating a channel from said plurality of channels that carries a reduced amount of data relative to other channels from said plurality of channels.

18. The method as set forth in claim 16 wherein step (c) is comprised of the steps of:

(c.1) generating a reference signal by measuring an energy level of said signal before demodulation; and (c.2) dividing said reference signal by said energy level of said signal before demodulation by said energy level of said non-orthogonal noise.

19. The method as set forth in claim 17 wherein step (c) is comprised of the steps of:

(c.1) generating a reference signal using a stored value; and (c.2) dividing said reference signal by said energy level of said non-orthogonal noise.

20. A method for processing a plurality of forward link signals comprising the steps of:

(a) receiving and storing said plurality of forward link signals and a corresponding plurality of noise signals;

(b) determining a non-orthogonal portion of each noise signal from said plurality of noise signals with respect to a corresponding forward link signal from said plurality of said forward link signal;

(c) adjusting each of said stored signals and corresponding non-orthogonal portion of each of said noise signals by an amount sufficient to set each of said non-orthogonal portions of each of said noise signals to a substantial equal value.

* * * * *